Feb. 22, 1927.
L. J. LINDSAY
GARDEN CULTIVATOR
Filed Oct. 12, 1926
1,618,382
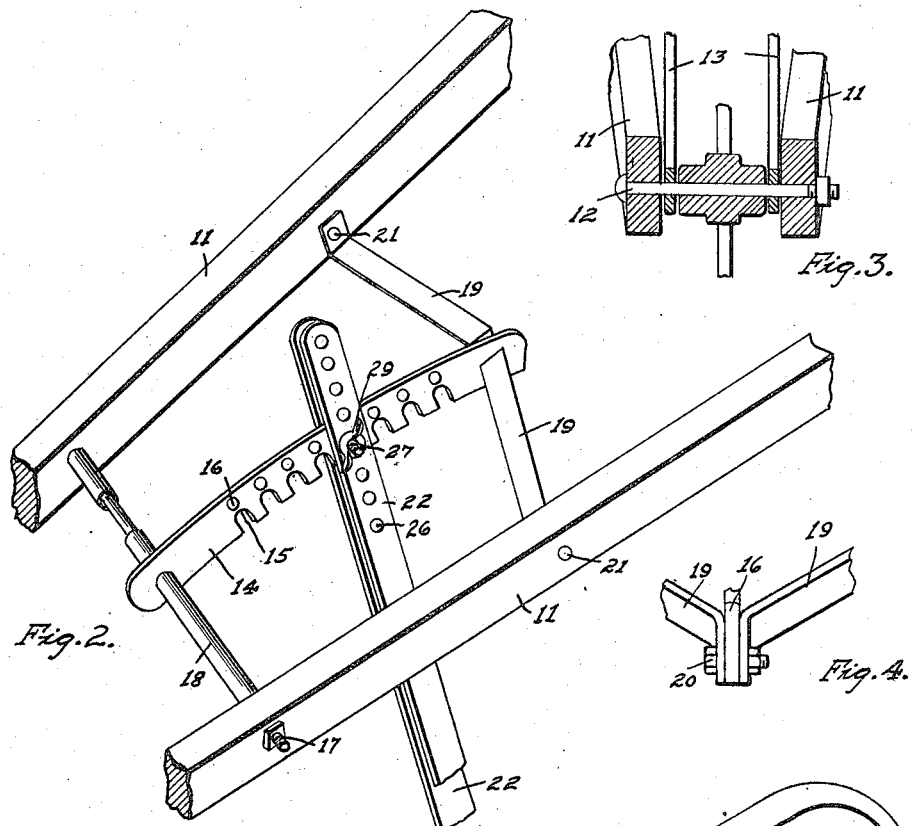
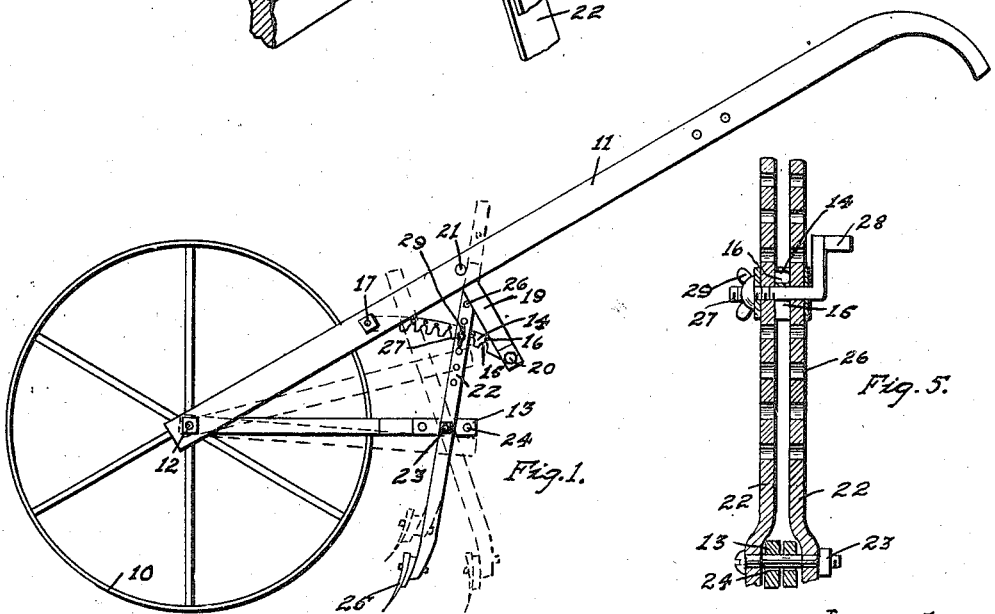
Inventor.
L. J. Lindsay.
by Orwig & Hague Attorneys.

Patented Feb. 22, 1927.

1,618,382

UNITED STATES PATENT OFFICE.

LEROY J. LINDSAY, OF SEYMOUR, IOWA, ASSIGNOR OF ONE-HALF TO HENRY T. LONG, OF SEYMOUR, IOWA.

GARDEN CULTIVATOR.

Application filed October 12, 1926. Serial No. 141,147.

My invention relates to that class of cultivators which are intended to be pushed by hand in advance of the operator, and which are provided at the front end with a supporting wheel, and which are also arranged to interchangeably employ garden hoes, weed cutters, plows, etc.

The object of my invention is to provide an implement of the class described of simple, durable and inexpensive construction, and so arranged that when the supporting wheel is resting upon the ground and the garden tool is resting in its proper position relative to the ground surface the handles to be grasped by the operator may readily, quickly and easily be adjusted to different heights for the convenience of the operator, and also the tool supporting member may be tilted forwardly or rearwardly for the convenience of the operator or to meet changed conditions in the material being operated upon.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a side elevation of an implement embodying my invention, the ground engaging tool being shown in one position in solid lines, and in one position by dotted lines raised vertically, and in another position by dotted lines tilted rearwardly to illustrate the adjustments.

Figure 2 shows an enlarged, detail, perspective view illustrating the means for tilting the tool supporting member, and holding it in its adjusted position.

Figure 3 shows an enlarged, detail, sectional view through the front end of the handles and the hub of the supporting wheel.

Figure 4 shows an enlarged detail view illustrating the means for supporting the rear end of the toothed rack device; and Figure 5 shows an enlarged, vertical, sectional view through the upper end of the tool supporting member and the toothed rack, illustrating the means for adjustably securing the tool supporting member to the toothed rack.

Referring to the accompanying drawings, I have used the reference numeral 10 to indicate the supporting wheel device to rest upon the ground surface, and 11 the handles to be grasped by the operator. These handles usually converge toward the wheel and are connected to the wheel by means of an axle 12 extended through the handles and the hub of the wheel. Pivotally mounted upon this axle between the hub and the handle members are two brace bars 13 extended rearwardly.

Mounted between the handles in the rear of the wheel 10 is a segmental rack bar 14 having notches 15 on its lower edge, and round openings 16 above the notches. This rack bar is supported in position at its front end by means of a bolt 17 extended through both handles and provided with spacing sleeves 18 mounted upon the bolt and engaging the outer surfaces of the rack bar 14 and the inner surfaces of the handles. At its rear end it is supported by two brackets 19 secured to the rack bar by a bolt 20 at the inner end and by rivets 21 at the outer ends, which pass through the handles.

The tool supporting member is preferably formed with two parallel bars 22 spaced apart and having near their central portions a bolt 23 extended through them, and also through the rear end of the brace bars 13, as shown in Figure 5. These brace bars are provided with a series of openings 24, so that the bolt 23 may be placed through any one of these openings for adjusting the inclination of the tool supporting member 22. At its lower end, the tool supporting member is provided with means to which may be detachably fixed a cultivator, weed cutter, plow or other garden implement, indicated generally by the reference numeral 25. The upper portion of the tool supporting member is formed with a series of openings 26 and a bolt 27, which may be provided with a crank 28 on one end and a wing nut 29 on the other end, is extended through the bars 22 and the rack bar 14, as shown in Figure 5. The curvature of the rack bar 15 is preferably centered at the normal pivotal point of the arms 13 to the member 22, as shown in Figure 1.

In practical operation, and assuming that the implement is in the position illustrated by solid lines in Figure 1, then the operator grasps the handles and pushes the implement in front of him. In the event that the operator finds that the handles are either too high or too low to suit his convenience, he simply removes the bolt 27 and reinserts it in one of the openings 26, either higher or lower on the member 22. Even after such adjustment to suit the convenience of the operator, it sometimes happens in actual practice that, due to the conditions of the soil or the weeds growing in it, it is desirable to have the handles either higher or lower, and when such conditions arise, this adjustment may be readily and easily made in the manner described.

During the operation of an implement of this character, conditions quite frequently occur which make it desirable to tilt the tool forwardly or rearwardly, and when this condition arises, and assuming that the bolt 27 is projected into one of the notches 15 in the rack bar, then all the operator need do in order to tilt the tool supporting member with its lower end rearwardly, as shown by dotted lines in Figure 1, is to elevate the handle above the ground, then grasp the upper end of the tool supporting member 22 and move it first downwardly until the bolt 27 is out of the notch 15, then incline it forwardly and raise it into the forward notch, and this can obviously be done without the use of tools or without manipulating any screws, bolts or the like, and hence can be done readily, quickly and easily, and may be frequently done during the cultivation of a single row of garden produce to suit the requirements or alter conditions in different parts of the row.

In the event that it should be desirable to firmly fix the bolt 27 in any particular location, then the operator removes the bolt 27 and reinserts it through one of the round openings 16 in the rack bar.

In ordinary practice, however, it has been found desirable and efficient to simply adjust the bolt 27 and the wing nut 29 so that it will yieldingly hold the sides of the tool supporting member 22 in frictional engagement with the sides of the rack bar, so that when any tilting adjustment of the tool supporting member is desirable, the operator may simply grasp the upper end of the tool supporting member and tilt it to the desired position where it will remain securely enough for all practical purposes.

I claim as my invention:

1. In an implement of the class described, the combination of a handle, a supporting wheel at the front of the handle, a brace bar pivotally mounted at the front of the handle and extended rearwardly, a rack bar fixed to the handles with the notches on its under side, a tool supporting member pivoted to the rear end of the brace bar, and a bolt extended through the tool supporting member and designed to engage in any of the notches of the rack bar for tilting the lower end of the tool supporting member forwardly or rearwardly and for holding it in its adjusted position during practical operation.

2. In an implement of the class described, the combination of a pair of handles, a supporting wheel mounted in the forward ends thereof, brace bars pivoted at the forward ends to the handles and extended rearwardly, a rack bar fixed in position between the handles and the rear of the wheel and formed with notches on its under surface, a tool supporting member comprising two parallel bars one on each side of the rack bar and formed with a series of openings in its upper end, the central portion of said tool supporting member being adjustably pivoted to the brace bar, and a bolt extended through the sides of the tool supporting member and designed to enter said notches in the rack bar, for the purposes stated.

3. In an implement of the class described, the combination of a pair of handles, a supporting wheel mounted in the forward ends thereof, brace bars pivoted at the forward ends to the handles and extended rearwardly, a rack bar fixed in position between the handles and the rear of the wheel and formed with notches on its under surface, a tool supporting member comprising two parallel bars one on each side of the rack bar and formed with a series of openings in its upper end, the central portion of said tool supporting member being adjustably pivoted to the brace bar, a bolt extended through the sides of the tool supporting member and designed to enter said notches in the rack bar, and a series of openings in the rack bar above the notches thereof designed to receive said bolt for fixing the tool supporting member relative to the rack bar.

Des Moines, Iowa, September 30, 1926.

LEROY J. LINDSAY.